Dec. 18, 1923.  E. W. SEEGER  1,477,774
MOTOR CONTROLLER
Filed Jan. 21, 1921
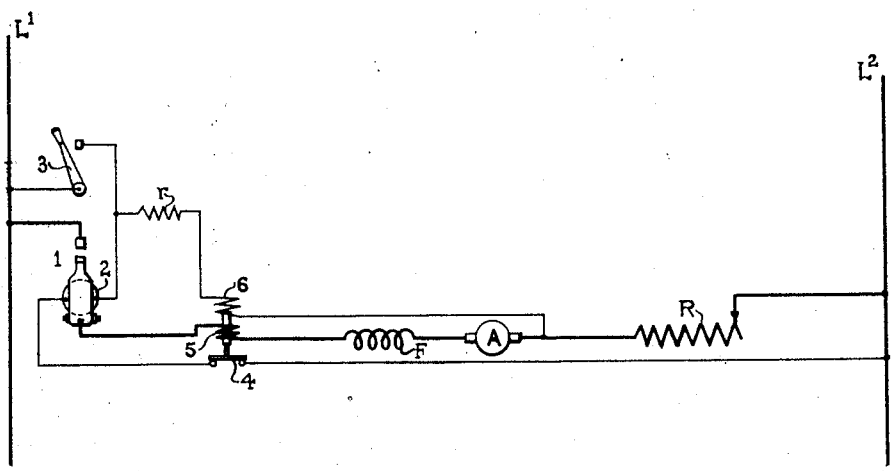
Inventor
Edwin W. Seeger
By Frank H. Hubbard
ATTORNEY Patented Dec. 18, 1923.

1,477,774

UNITED STATES PATENT OFFICE.

EDWIN W. SEEGER, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed January 21, 1921. Serial No. 438,820.

*To all whom it may concern:*

Be it known that I, EDWIN W. SEEGER, a citizen of the United States, residing at Milwaukee, in the county of Milwaukee and State of Wisconsin, have invented new and useful Improvements in Motor Controllers, of which the following is a full, clear, concise, and exact description, reference being had to the accompanying drawing, forming a part of this specification.

This invention relates to motor controllers and more particularly to controllers affording protection against overloads.

An object of the invention is to provide an improved controller of the character wherein the overload protective means is automatically controlled to permit supply to the motor of a sufficiently heavy current for starting while limiting the running current to a predetermined lower value.

Another object is to provide a controller wherein the overload protecting means is provided with a series winding and a shunt winding the latter being automatically controlled to cause said means to function as stated and to also require manually controlled resetting of said means following response thereof.

Other objects and advantages of the invention will hereinafter appear.

The accompanying drawing diagrammatically illustrates one embodiment of the invention which will now be described, it being understood that the embodiment illustrated is susceptible of various modifications without departing from the scope of the appended claims.

Referring to the drawing there is illustrated a series motor AF to be connected across supply lines L' and L² by an electroresponsive main switch 1, the circuit of said motor including a starting resistance R. It is to be understood that the motor might be of other types and that the starting resistance may be controlled in any preferred manner for exclusion thereof.

The main switch 1 has an operating winding 2, the circuit of which includes a manually operable control switch 3 and an overload relay 4. When the overload relay is closed closure of switch 3 connects the winding of switch 1 across the lines L' and L² for response of the latter switch to start the motor after which the motor may be accelerated by exclusion of resistance R.

The overload relay has a winding 5 connected in series with the motor and a winding 6 connected across the motor armature and hence subject to control by the counter-voltage of the motor. More specifically the winding 6 has one terminal connected through a protective resistance $r$ and switch 3 to line L' and its other terminal connected to the motor armature A and a resistance R at a point therebetween. Thus assuming closure of switches 1 and 3 winding 6 is as stated subject to control by the counter-voltage of the motor whereby the pull of said winding varies with the motor speed. On the other hand when the switch 1 is opened to stop the motor, retention of the switch 3 in closed position connects the winding 6 across lines L' and L² through the starting resistance R and resistance $r$ for continued energization of said winding.

The windings 5 and 6 are cumulative and the relay is adjusted to respond to a predetermined cumulative pull thereof during either starting or running of the motor. However, it will be apparent that inasmuch as the winding 6 is controlled by the counter-voltage of the motor its pull will be negligible when the motor is initially started but will increase as the motor accelerates, thus permitting the supply of a greater amount of current to the motor for starting and accelerating than for running. Accordingly the relay may be readily designed to respond at the desired value of motor current during running without curtailment of the current values desired for starting and acceleration. Moreover, the relay is adapted to so function without impairment of the utility of winding 6 for insuring against automatic resetting of said relay. As will be apparent response of the relay de-energizes the main switch 1 to interrupt the motor circuit, switch 3 remaining closed. Accordingly, winding 6 remains in circuit across lines L' and L² through resistances R and $r$, being thereby sufficiently energized to hold the relay against return movement pending operation of switch 3 to interrupt the circuit of said winding.

What I claim as new and desire to secure by Letters Patent is:

1. In combination, an electric motor, an electro-responsive switch controlling the continuity of the motor circuit, an overload relay in circuit with the operating winding of said switch, said relay having a winding in series with the motor and a winding subjected to the counter voltage of the motor and a control switch to establish line connections for the winding of said switch and also the countervoltage winding of said relay whereby said control switch must be operated to interrupt the line connections of both windings for resetting of said relay following response thereof.

2. In combination, an electric motor and control means therefor including overload protecting means subject to control by the value of the motor current and the countervoltage of the motor and having means insuring against automatic resetting thereof after responding to an overload.

3. In combination, an electric motor and control means therefor including a relay having a winding subject to control by the value of the motor current and a winding subject to control by the counter-voltage of the motor, the latter winding having line connections whereby it functions to hold said relay against return movement after response thereof.

4. In a motor controller in combination an electro-responsive switch controlling the continuity of the motor circuit, an overload relay in circuit with the operating winding of said switch, said relay having cumulative windings one for connection in the motor circuit and one for connection across the motor armature and line connections for the latter winding including a switch requiring operation for deenergizing said latter winding prior to reestablishment of the motor circuit following response of said relay.

5. An electrical system of connections comprising an electrical translating device, a starting current-diminishing means for the protection of said translating device and a circuit breaker means comprising a normal control coil for said breaker means, and an auxiliary control coil operatively connected across said translating device to increase the sensitiveness of said circuit breaker means when the current-diminishing means is gradually eliminated.

In witness whereof, I have hereunto subscribed my name.

E. W. SEEGER.